(12) United States Patent
Wurzer et al.

(10) Patent No.: US 10,933,923 B1
(45) Date of Patent: Mar. 2, 2021

(54) HORIZONTAL CABINET KIT IN SLEEPER CAB OF A TRUCK

(71) Applicants: Adam J. Wurzer, Carroll, IA (US); Terry D. Wurzer, Coon Rapids, IA (US); David T. Wurzer, Carroll, IA (US)

(72) Inventors: Adam J. Wurzer, Carroll, IA (US); Terry D. Wurzer, Coon Rapids, IA (US); David T. Wurzer, Carroll, IA (US)

(\*) Notice: Subject to any disclaimer, the term of this patent is extended or adjusted under 35 U.S.C. 154(b) by 0 days.

(21) Appl. No.: 16/366,419

(22) Filed: Mar. 27, 2019

(51) Int. Cl.
- *B60R 7/04* (2006.01)
- *B62D 33/06* (2006.01)
- *A47B 47/00* (2006.01)
- *B60R 7/08* (2006.01)

(52) U.S. Cl.
CPC .......... *B62D 33/0612* (2013.01); *A47B 47/00* (2013.01); *B60R 7/08* (2013.01); *B60Y 2200/148* (2013.01)

(58) Field of Classification Search
CPC ........ B62D 33/0612; A47B 47/00; B60R 7/08
See application file for complete search history.

(56) References Cited

U.S. PATENT DOCUMENTS

| | | | | |
|---|---|---|---|---|
| 6,644,523 B1* | 11/2003 | Salas | ....................... | B60R 7/043 224/275 |
| 6,899,379 B1* | 5/2005 | Milenovich | ........ | B62D 33/0612 296/190.02 |
| 7,021,701 B1* | 4/2006 | Hoernle | ............. | B62D 33/0612 296/190.02 |
| 7,104,593 B2* | 9/2006 | Hungerford | ....... | B62D 33/0612 296/190.02 |
| 7,152,913 B2* | 12/2006 | Milenovich | ........ | B62D 33/0612 296/190.02 |
| 10,137,841 B1* | 11/2018 | Neag | ....................... | B60R 7/043 |
| 10,513,228 B2* | 12/2019 | Steele | ....................... | B60R 9/06 |
| 10,625,679 B1* | 4/2020 | Wurzer | ..................... | B60R 7/04 |
| 2002/0096913 A1* | 7/2002 | Moriaux | ............ | B62D 33/0612 296/190.02 |
| 2005/0104415 A1* | 5/2005 | Hungerford | ....... | B62D 33/0612 296/190.02 |
| 2005/0134066 A1* | 6/2005 | Milenovich | ........ | B62D 33/0612 296/24.33 |
| 2006/0242762 A1* | 11/2006 | Drummond | ............ | A47C 17/80 5/118 |

(Continued)

FOREIGN PATENT DOCUMENTS

DE 102005020613 * 6/2006

*Primary Examiner* — Kimberly S Wright
(74) *Attorney, Agent, or Firm* — Dennis L. Thomte; Thomte Patent Law Office LLC

(57) ABSTRACT

A plurality of different kits is provided for assembling horizontal cabinets in the sleeper cab of the truck. Each of the kits provide a horizontal cabinet which is positioned beneath the bunk of the sleeper cab. In one kit, a drawer assembly and a refrigerator are positioned in the cabinet. In another kit, a pair of drawer assemblies are positioned in the cabinet. In another kit, a pair of refrigerators are positioned in the cabinet. In another kit, a freezer is positioned in the cabinet. In another kit, a pair of freezers are positioned in the cabinet. All of the kits include a mounting plate which is secured to the floor of the sleeper cab beneath the bunk of the sleeper cab. In all of the kits a trim assembly is provided.

7 Claims, 12 Drawing Sheets

(56) References Cited

U.S. PATENT DOCUMENTS

| | | | |
|---|---|---|---|
| 2008/0164724 A1* | 7/2008 | Burnett | A47B 67/04 296/190.02 |
| 2008/0191515 A1* | 8/2008 | Hollenbeck | B60P 3/36 296/190.02 |
| 2009/0140537 A1* | 6/2009 | Kittelson | F25D 23/10 296/24.4 |
| 2010/0102593 A1* | 4/2010 | Bisinger | B60N 3/001 296/190.01 |
| 2019/0275951 A1* | 9/2019 | Steele | E06B 1/52 |

* cited by examiner

HORIZONTAL CABINET KIT IN SLEEPER CAB OF A TRUCK

BACKGROUND OF THE INVENTION

Field of the Invention

This invention relates to a horizontal cabinet kit for use in a sleeper cab of a truck. More particularly, the horizontal cabinet kit may be assembled and positioned below the bunk of a sleeper cab of a truck. Many different items may be provided in the kit such as drawers, refrigerators, freezers, microwave ovens, etc.

Description of the Related Art

Many cabinets or storage units have been previously provided for use in a sleeper cab of a truck with the cabinet having a television set positioned therein. However, the cabinets of the prior art are of such size that they must be installed in the sleeper cab prior to the installation of the driver's seat and passenger's seat being installed in the cab of the truck. Thus, many sleeper cab trucks are assembled without televisions, refrigerators, etc. It is therefore extremely difficult, if not impossible, to place such a cabinet into the sleeper portion of the sleeper cab of a truck.

Applicants' earlier patent application, Ser. No. 15/918,065 filed Mar. 12, 2018 entitled KIT FOR ASSEMBLING A CABINET IN A SLEEPER CAB OF A TRUCK provided a kit for assembling an upstanding cabinet in a sleeper cab of a truck with the assembled cabinet being positioned in the interior of the sleeper cab at one side of the sleeper cab. Although Applicants' earlier invention has been a commercial success, it has been discovered that a horizontally disposed cabinet could be positioned beneath the bunk of the sleeper cab.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A kit is provided for assembling a horizontal cabinet on the floor of a sleeper cab beneath the bunk of the sleeper cab. In a first embodiment, the kit includes a mounting plate having a forward end, a rearward end, a first side, a second side, an upper side and a lower side with the mounting plate having a plurality of threaded mounting studs extending upwardly therefrom. The mounting plate is positioned on the floor of the sleeper cab below the bunk of the sleeper cab and is secured to the floor of the sleeper cab. In the first embodiment, a first drawer assembly is secured to the threaded studs on the mounting plate. In the first embodiment, a refrigerator, freezer or microwave oven is mounted on the mounting plate at one side of the drawer assembly. A trim assembly is secured to mounting brackets on the mounting plate so as to be partially positioned around the forward end of the drawer assembly and the refrigerator, freezer or microwave oven.

In another embodiment, a second drawer assembly is mounted on the mounting plate rather than the refrigerator, freezer or microwave oven.

In another embodiment, a pair of freezers, refrigerators or microwave ovens are mounted on the mounting plate in a side-by-side relationship.

In another embodiment, a single refrigerator, microwave oven, or freezer or drawer assembly is mounted on the mounting plate.

It is therefore a principal object of the invention to provide a horizontal cabinet kit for use in a sleeper cab of a truck.

A further object of the invention is to provide a kit for assembling a horizontal cabinet in a sleeper cab of a truck.

A further object of the invention is to provide a kit for assembling a horizontal cabinet in a sleeper cab of a truck with the cabinet including a drawer assembly at one side of a mounting plate and a refrigerator, microwave oven or freezer mounted at the side of the drawer assembly.

A further object of the invention is to provide a kit of the type described which includes a trim assembly which is secured to the mounting plate of the kit so as to be at least partially positioned around the forward end of the units mounted on the mounting plate.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
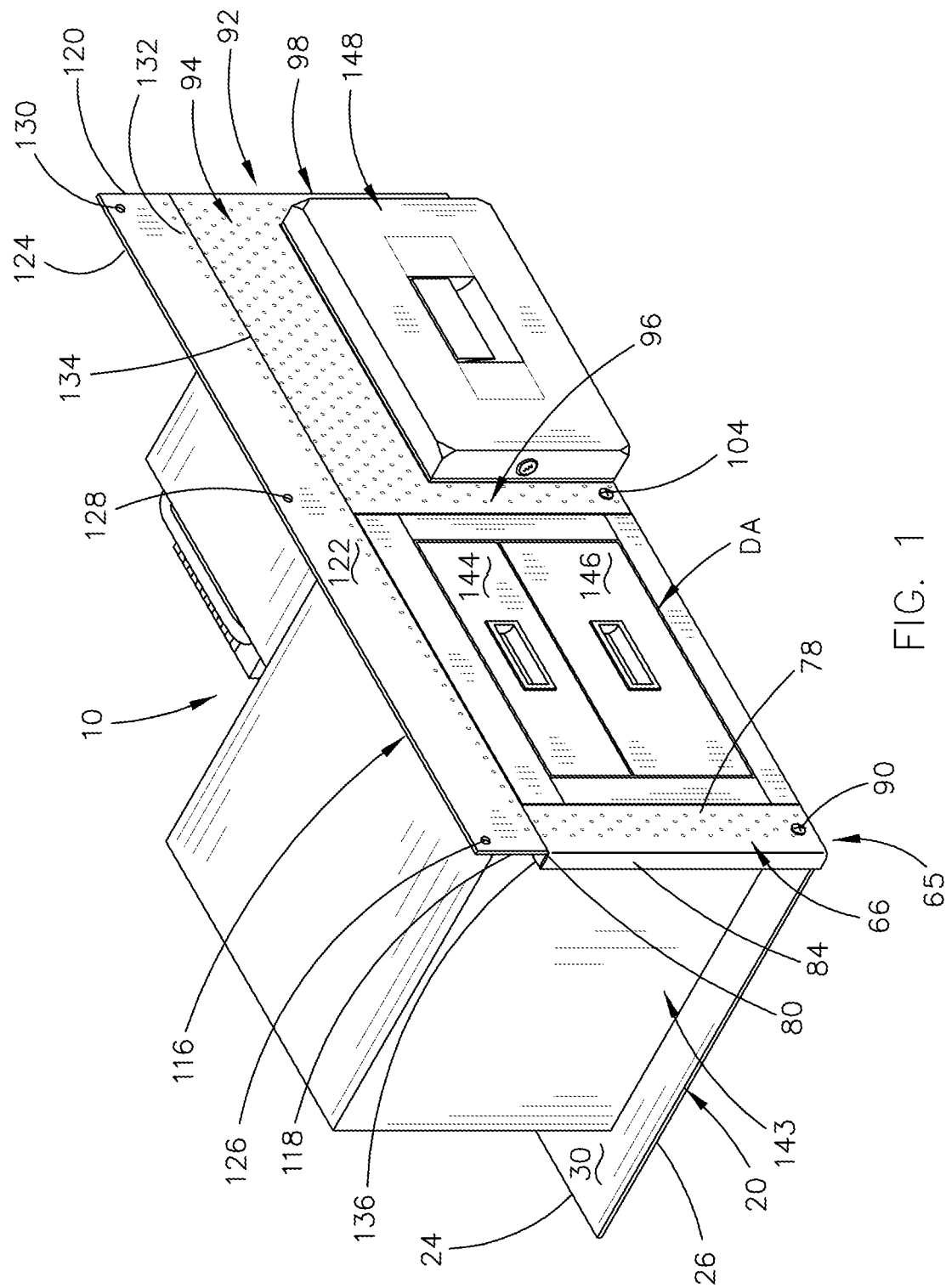
FIG. 1 is a front perspective view of one embodiment of an assembled kit of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the first embodiment of the horizontal cabinet kit of this invention which may be assembled in the sleeper cab 12 of a truck 14 for positioning below the bunk 16 on the floor 18 beneath the bunk 16. Bunk 16 includes frame 17. The first embodiment 10 of this invention is illustrated in FIGS. 1-8. Embodiment 10 includes a flat mounting plate 20 having a forward end 22, a rearward end 24, a first side 26, a second side 28, an upper side 30 and a lower side 32. The forward end 22 of mounting plate 20 has mounting brackets 34, 36 and 38 extending upwardly therefrom which have threaded nuts 40, 42 and 44 secured thereto respectively. A plurality of spaced-apart threaded studs 46, 48, 50, 52, 54, 56, 58 and 60 are secured to plate 20 which extend upwardly from the upper side 30 of plate 26. The plate 20 has a plurality of spaced-apart openings 62 formed therein which receive screws 64 extending downwardly therethrough into floor 18 to secure mounting plate 20 to the floor 18 beneath bunk 16. Trim assembly 65 of embodiment 10 includes a vertically disposed and channel-shaped trim member 66 having a front side 68, an upper end 70, a lower end 72, a first side 74 and a second side 76. The front side 68 of trim member 66 has a plurality of ventilation openings 78 formed therein. A horizontally disposed upper wall 80 extends rearwardly from the upper end 70 of front side 68 of member 66. Upper wall 80 has a plurality of screw openings 82 formed therein. Side wall 84 extends rearwardly from the first side 74 of front side 68. Side wall 86 extends rearwardly from the second side 76 of front side 68. The lower end of front side 68 has a bolt opening 88 formed therein which is configured to have bolt 90 extending rearwardly therethrough. The rearward end of bolt 90 is threadably secured to nut 40 on mounting bracket 20 to secure the lower end of trim member 66 to mounting plate 20.

Figure 2:
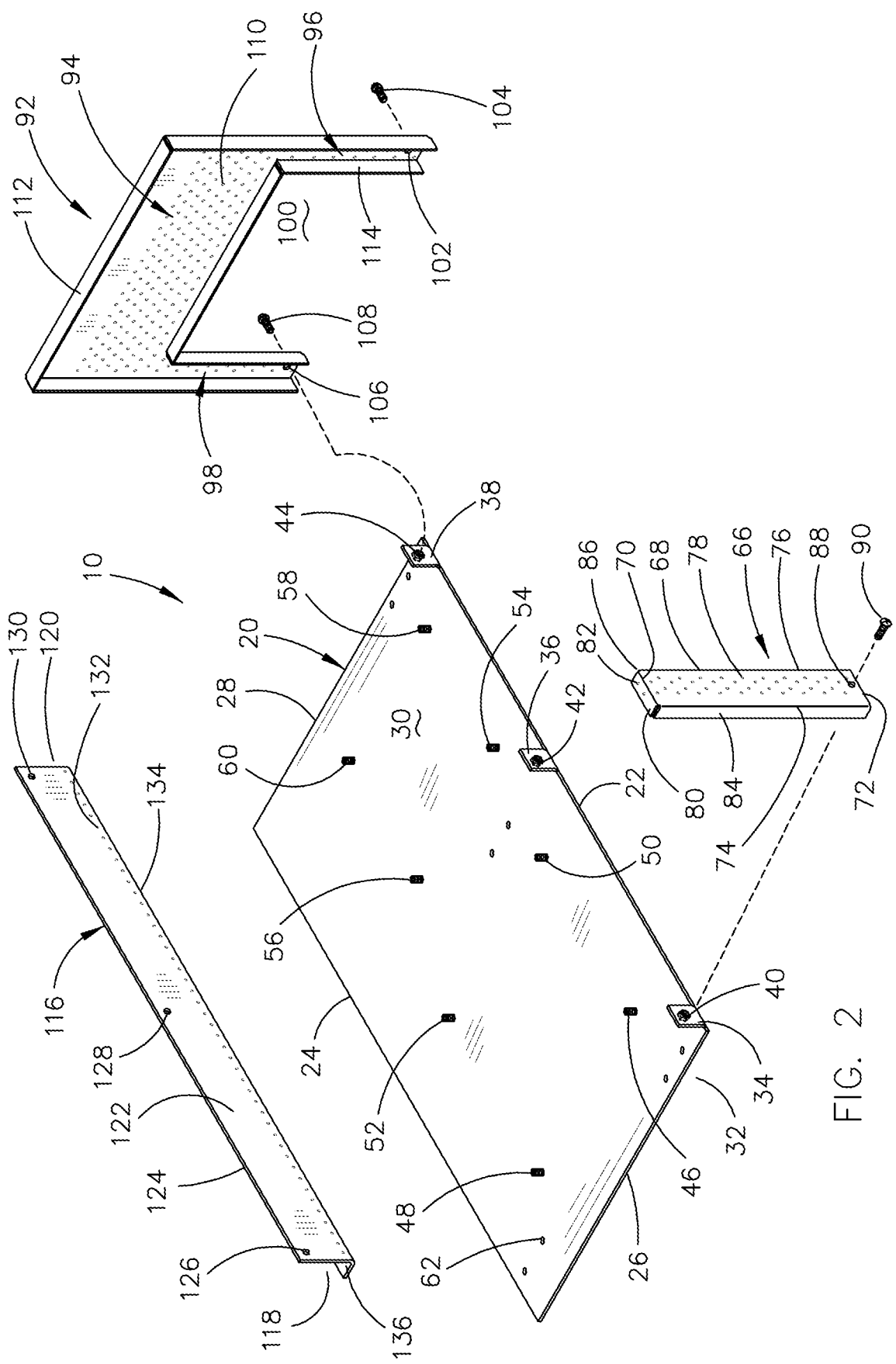
FIG. 2 is an exploded partial front perspective view of the embodiment of FIG. 1.
Figure 3:
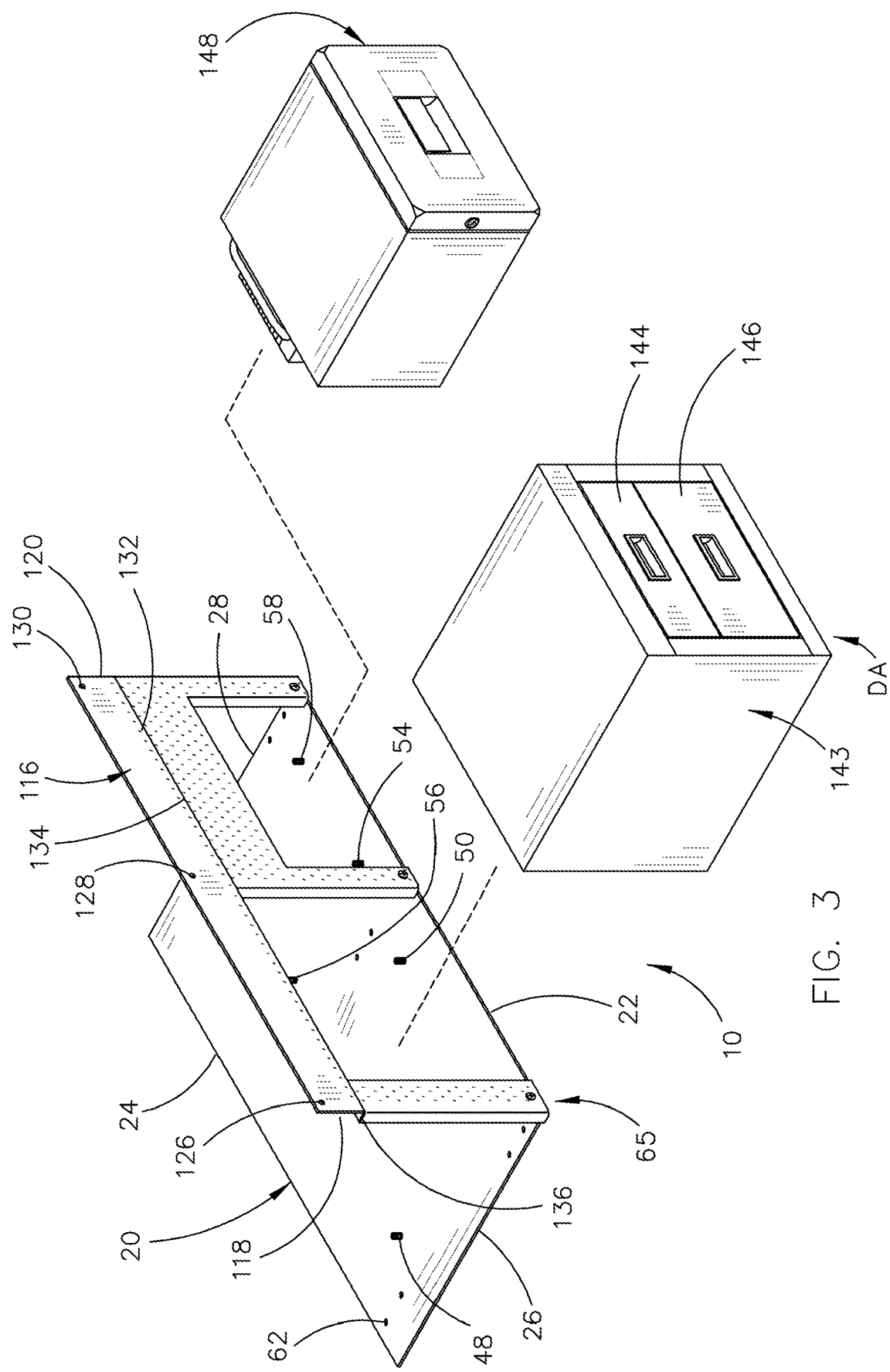
FIG. 3 is an exploded perspective view of the embodiment of FIG. 1.
Figure 4:
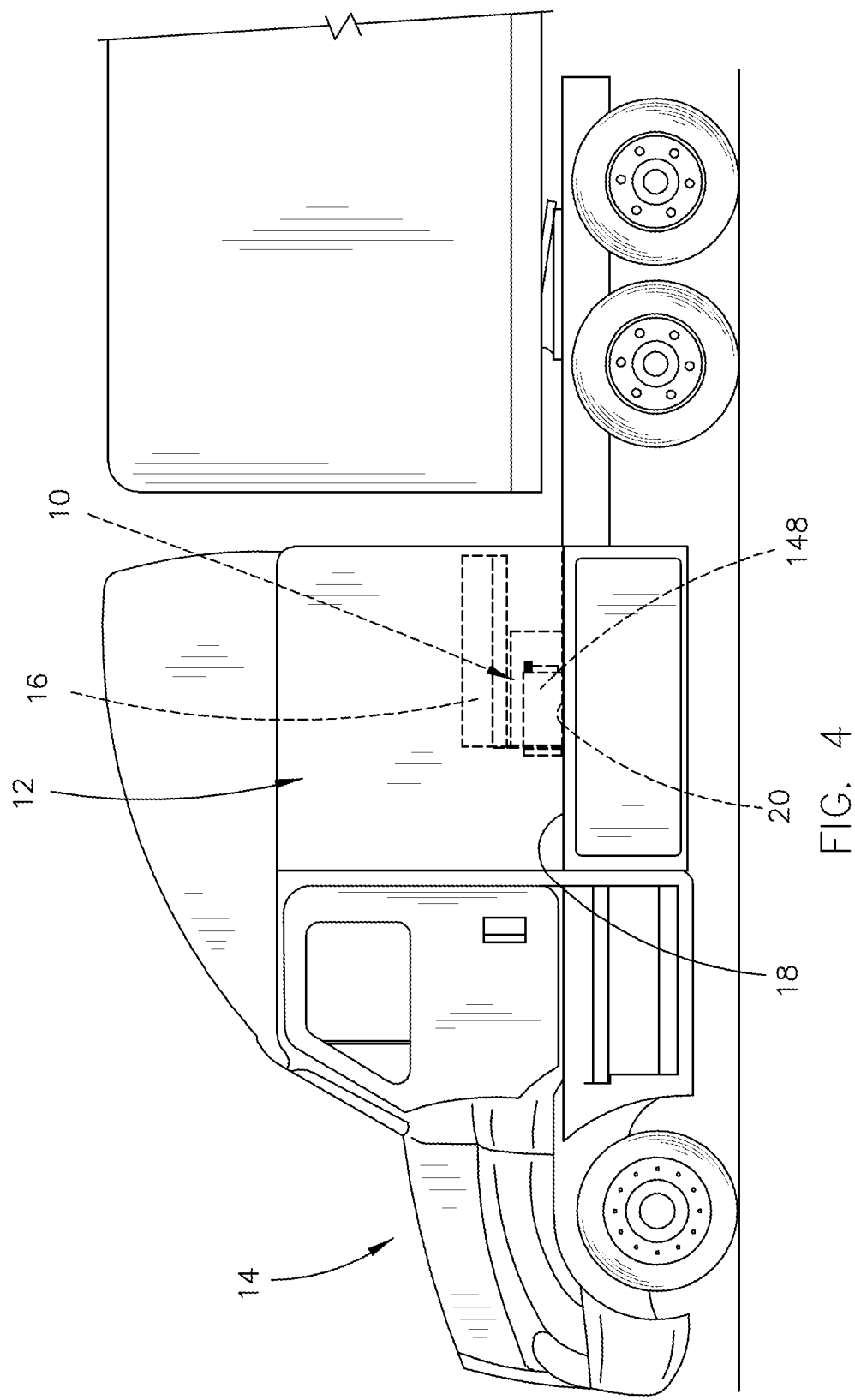
FIG. 4 is a side elevational view of a truck sleeper cab having the assembled cabinet of FIG. 1 being shown by broken lines with the cabinet being positioned below the bunk of the sleeper cab.
Figure 5:
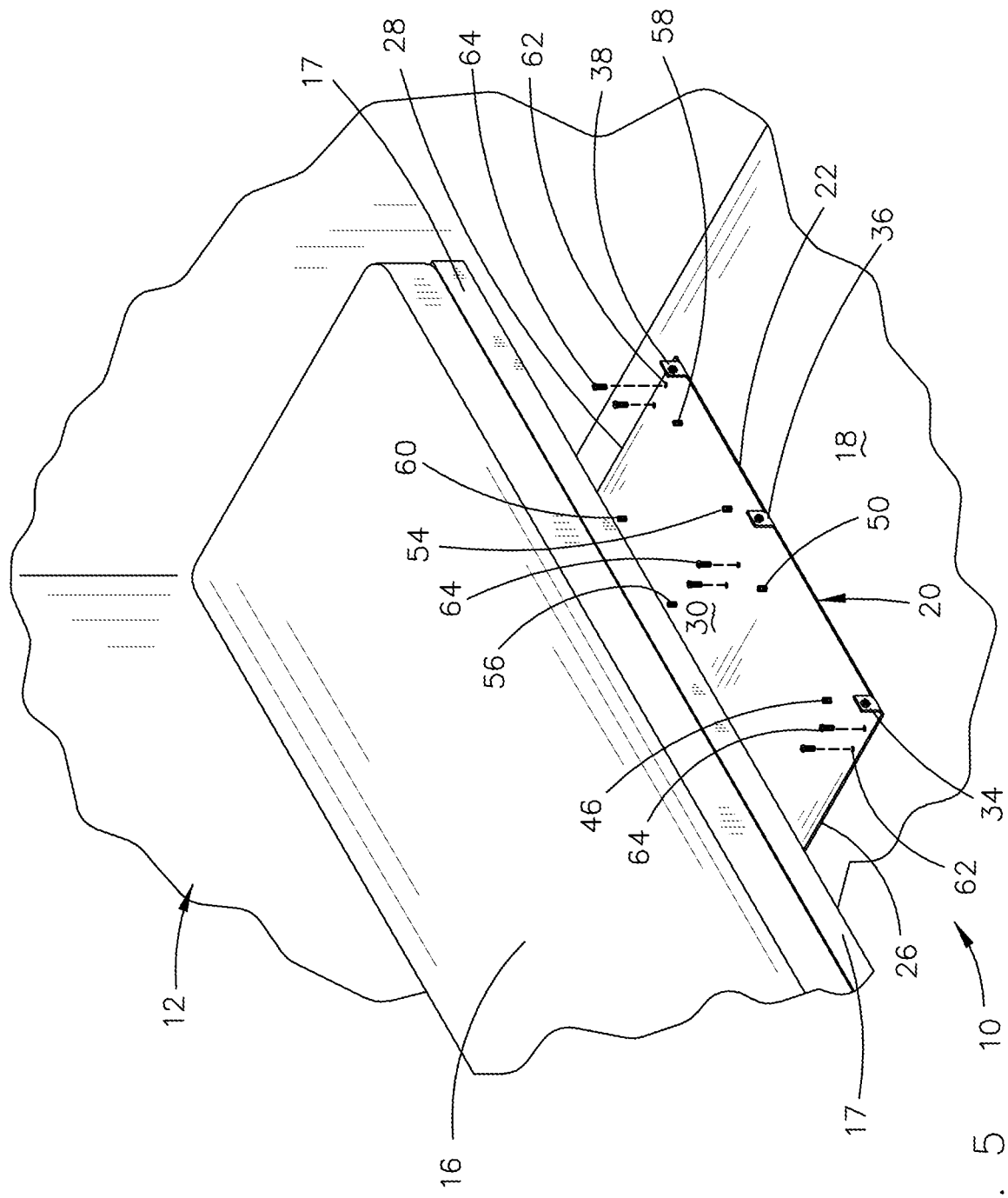
FIG. 5 is a partial perspective view illustrating the mounting plate of this invention secured to the floor of the sleeper cab below the bunk thereof.
Figure 6:
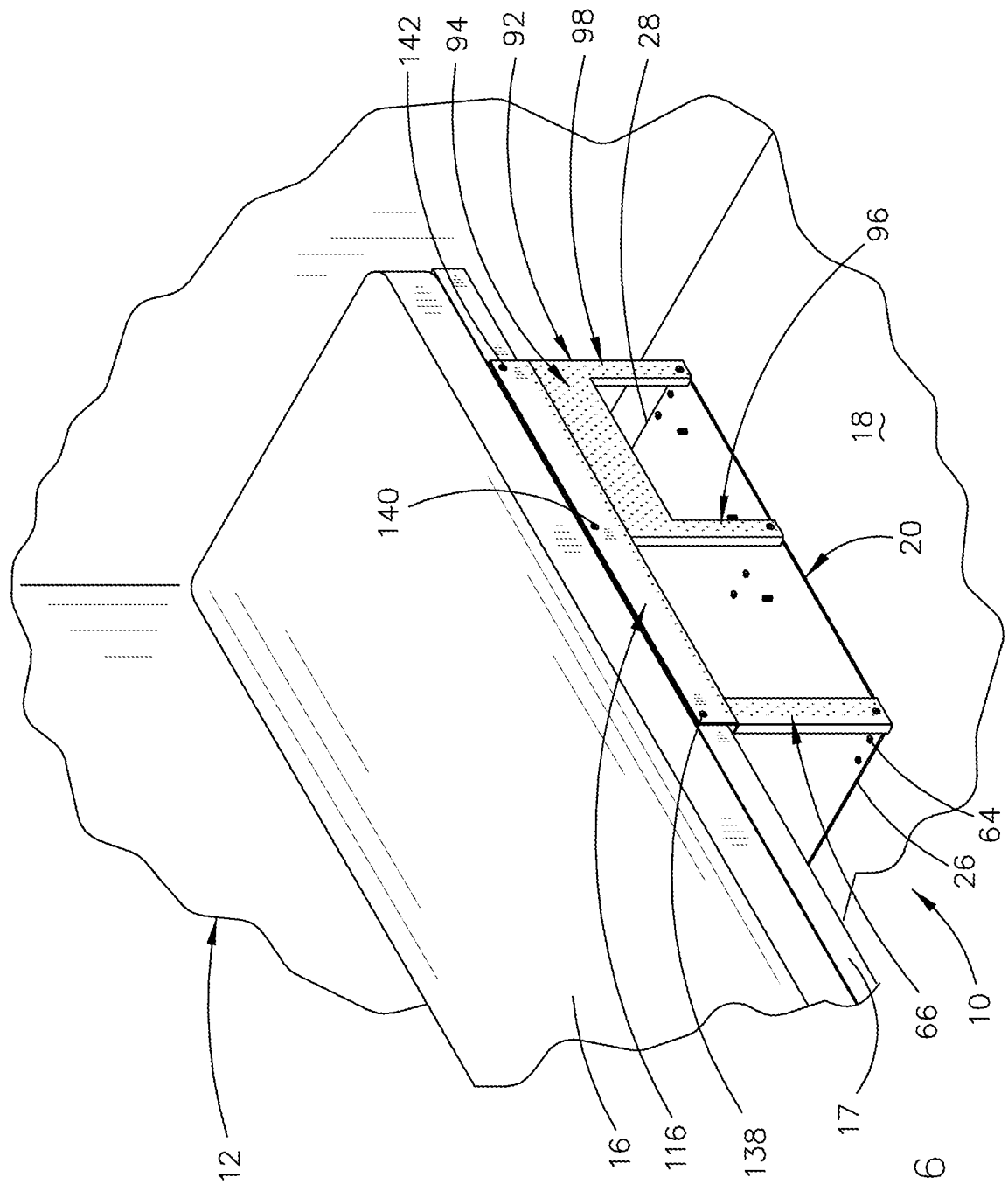
FIG. 6 is a partial perspective view illustrating the embodiment of FIG. 1 positioned below the bunk of the sleeper cab.
Figure 7:
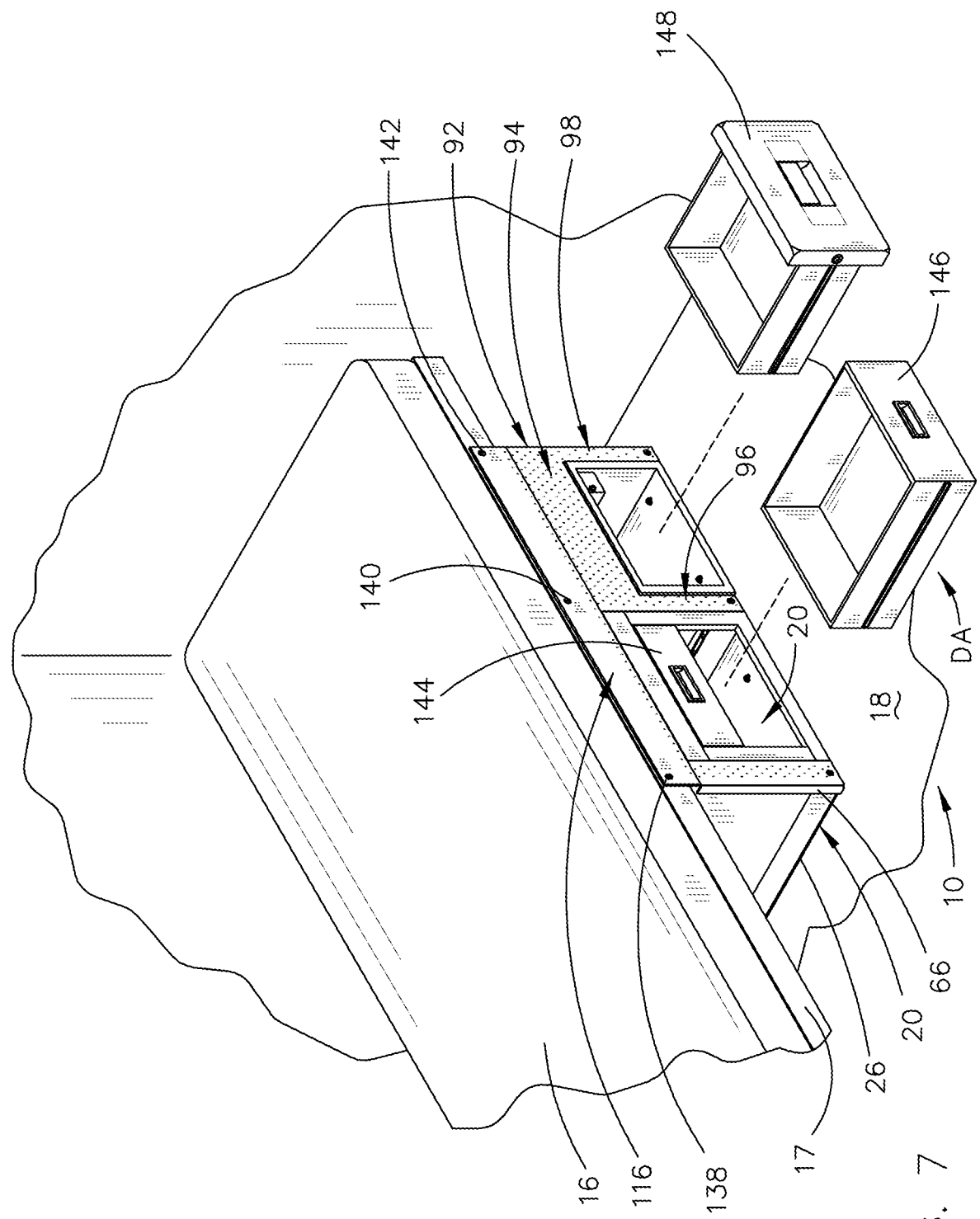
FIG. 7 is a partial perspective view of the embodiment of FIG. 1 and of the drawers positioned outwardly of the cabinet and which illustrates the refrigerator or freezer of FIG. 1 being positioned outwardly of the cabinet for purposes of illustration.
Figure 8:
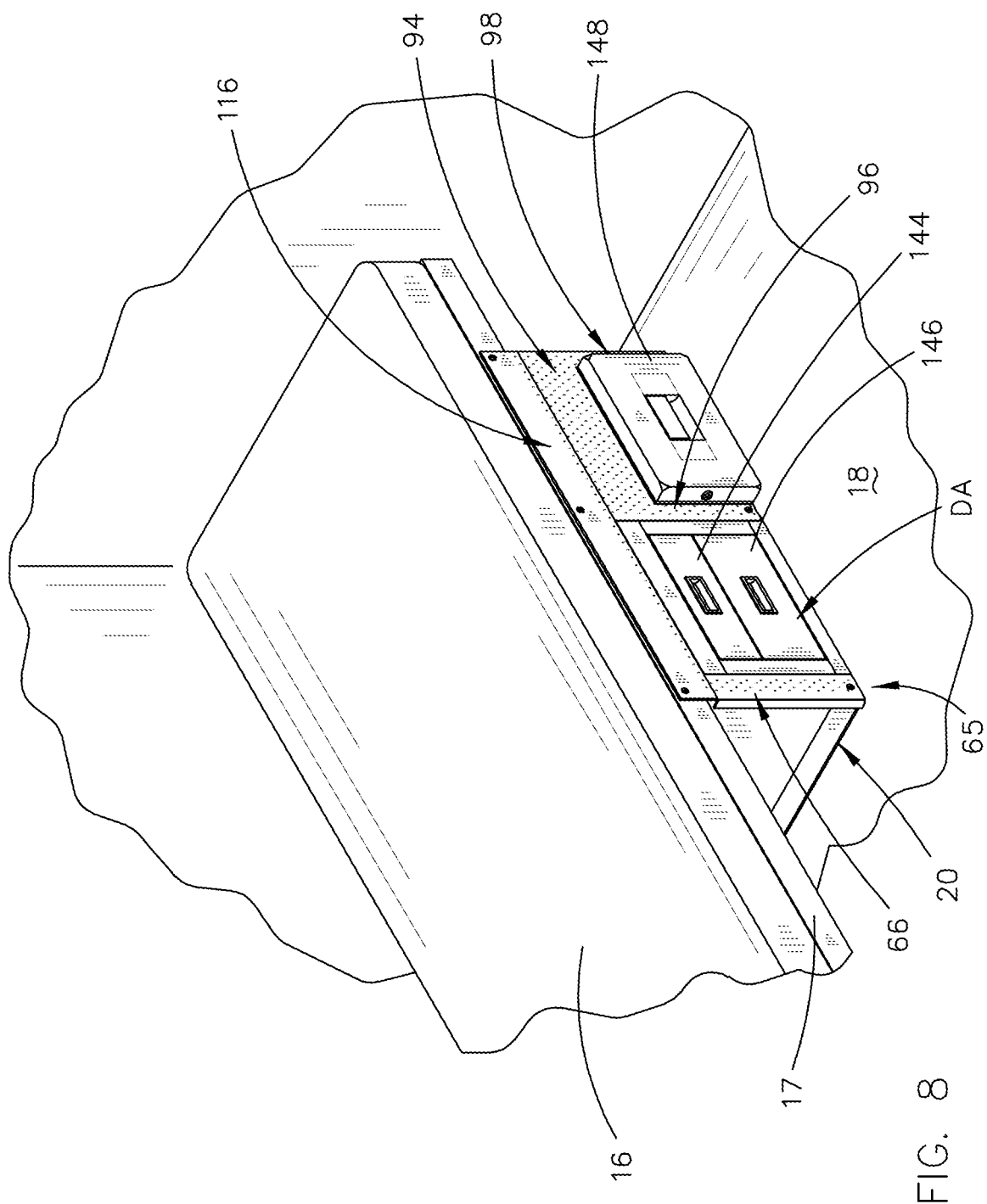
FIG. 8 is a partial perspective view of the embodiment of FIG. 1 illustrating the drawers and refrigerator or freezer in their fixed positions.

The numeral 92 refers to a generally U-shaped trim member having an upper portion 94, a first side portion 96 and a second side portion 98 which define a rectangular opening 100. The lower end of side portion 96 has a bolt opening 102 formed therein which is configured to have bolt 104 extending rearwardly therethrough. The lower end of side portion 96 has a bolt opening 106 formed therein which is configured to have bolt 108 extending rearwardly therethrough. The upper portion 94, first side portion 96 and second side portion 98 have ventilation openings 110 formed therein. As seen in FIG. 2, the rearward sides of upper portion 94, first side portion 96 and second side portion 98 have a flange 112 extending rearwardly therefrom. As also seen in FIG. 2, trim member 92 has a flange 114 extending rearwardly therefrom around the opening 100. The lower ends of side portions 96 and 98 are secured to mounting brackets 36 and 38 respectively by the bolts 104 and 108 being threadably secured to the nuts 42 and 44 of mounting brackets 36 and 38 respectively to secure the trim member 92 to the mounting plate 20 in a vertically disposed position.

The numeral 116 refers to an elongated and horizontally disposed trim member having a first end 118, a second end 120 and an outer side 122. The upper end 124 of trim member 116 has screw openings 126, 128 and 130 formed therein. Trim member 116 has a plurality of ventilation openings 132 formed therein adjacent the lower end 134 of trim member 116. Trim member 116 has a rearwardly extending flange 136 at the lower end 134 of trim member 116.

The embodiment 10 includes a drawer assembly DA having a frame 143 in which drawers 144 and 146 are slidably mounted. Embodiment 10 also includes a refrigerator, freezer or microwave oven 148.

The embodiment 10 is assembled in the sleeper cab 12 as will now be described. The mounting plate 20 with the threaded studs 46, 48, 50, 52, 54 and 56 extending upwardly therefrom is positioned on the floor 18 of sleeper cab 12 beneath the bunk 16. Mounting plate 20 is secured to floor 18 by driving the self-tapping screws 64 downwardly through the openings 62 into the floor 18. The frame 143, with the drawers 144 and 146 removed therefrom, is positioned on the mounting plate 20 at the left side thereof. The lower end of frame 143 is then secured to the threaded studs 46, 48, 60 and 52 by nuts (not shown). The drawers 144 and 146 are then inserted into frame 143. The refrigerator, freezer or microwave oven 148 is then positioned on mounting plate 20 at the right-hand side thereof and is secured to mounting plate 20 by the threaded studs 54, 56, 58 and 60 by nuts (not shown).

The trim assembly 65 is then installed as follows. The lower end 72 of trim member 66 is secured to the bracket 34 by extending the bolt 90 through bolt opening 88 and threadably securing bolt 90 to the threaded nut 40 on bracket 34. The trim member 92 is then positioned in an upright position at the forward end 22 of mounting plate 20. The lower end of the first side portion 96 is secured to bracket 36 by extending bolt 104 through bolt opening 102 with the inner end of bolt 104 being threadably secured to nut 42 on mounting bracket 36. The lower end of the second side portion 98 is secured to mounting bracket 38 by extending bolt 108 through bolt opening 106 and threadably securing bolt 108 to nut 44 on mounting bracket 38.

The trim member 116 is then positioned on the upper wall 80 of trim member 66 with trim member 116 also being positioned on the flange 112 of trim member 92. Flange 136 of trim member 116 is then secured to upper wall 80 of trim member 66 by screws extending into screw openings 82 of upper wall 80. If necessary, the flange 136 of trim member 116 may be secured to the flange 112 of trim member 92. Trim member 116 is then secured to the frame 17 of bunk 16 by extending screws 138, 140 and 142 through openings 126, 128 and 130 in trim member 116 into frame 17 of bunk 16.

Figure 9:
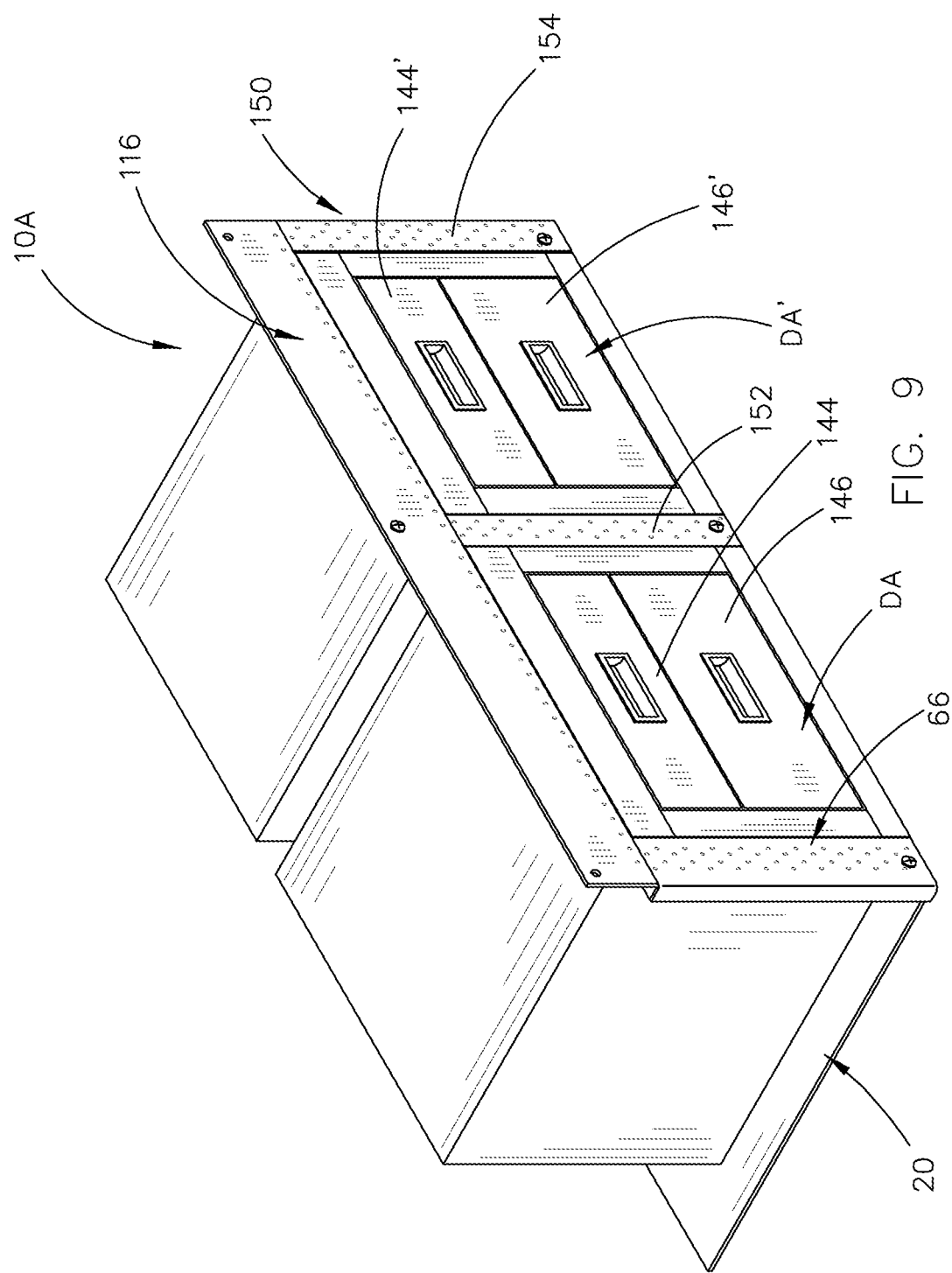
FIG. 9 is a perspective view of a second embodiment of the invention.

The second embodiment of the invention is referred to by the reference numeral 10A in FIG. 9. Embodiment 10A is generally identical to embodiment 10 except that a second drawer assembly DA' is utilized rather than a refrigerator, freezer or microwave oven with the drawers thereof being designated 144' and 146'. The trim assembly 150 of embodiment 10A includes trim member 66, an intermediate trim member 152 and an end trim member 154 with the lower ends of trim members 66, 152 and 154 being secured to the mounting brackets of mounting plate 20.

Figure 10:
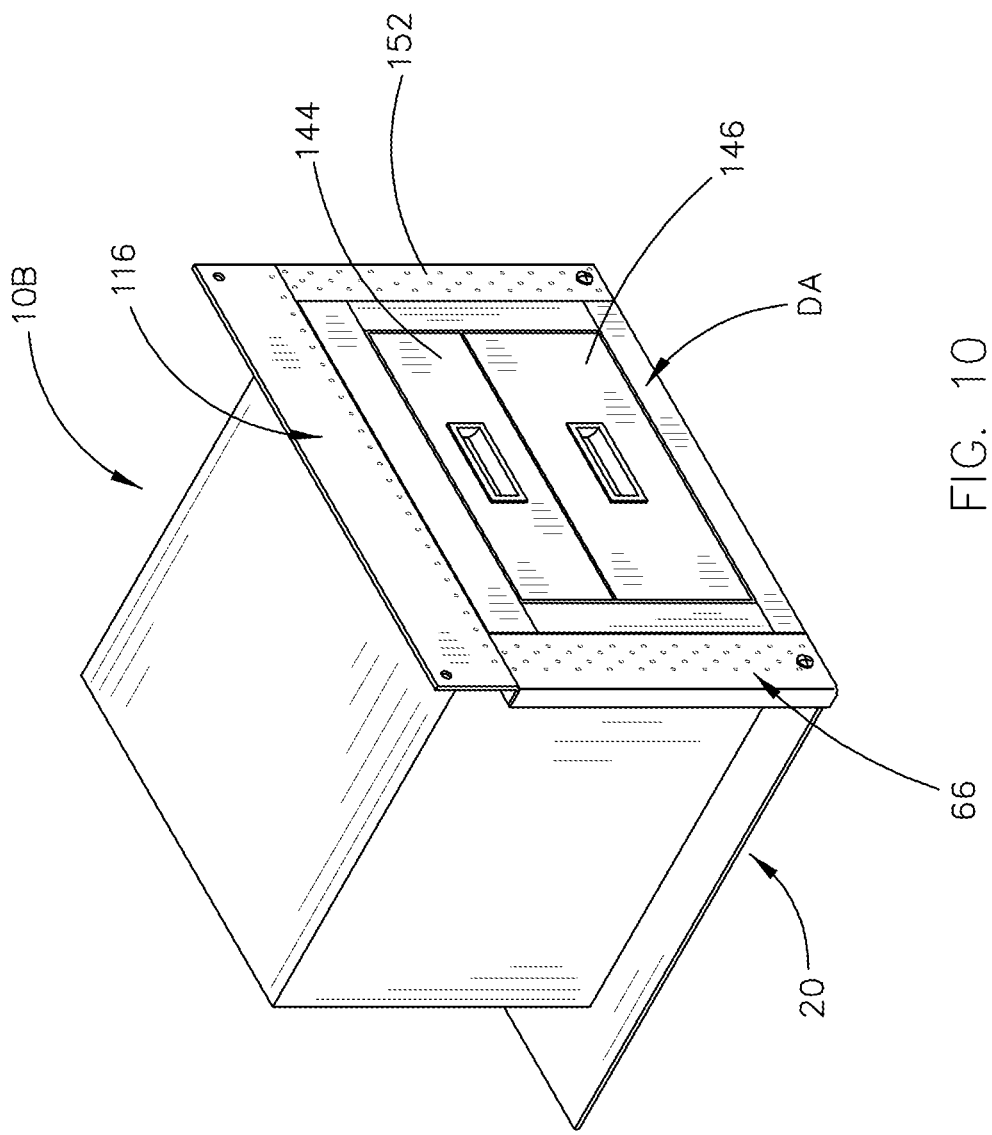
FIG. 10 is a perspective view of a third embodiment of the invention.

The third embodiment of the invention is referred to by the reference numeral 10B in FIG. 10. Embodiment 10B is generally identical to embodiment 10A except that the drawers 144' and 146' of embodiment 10A are not utilized. As seen in FIG. 10, the trim member 116 in FIG. 10 is shorter than the trim member 116 in FIG. 1. As also seen in FIG. 10, the trim member 154 of FIG. 9 is not utilized.

Figure 11:
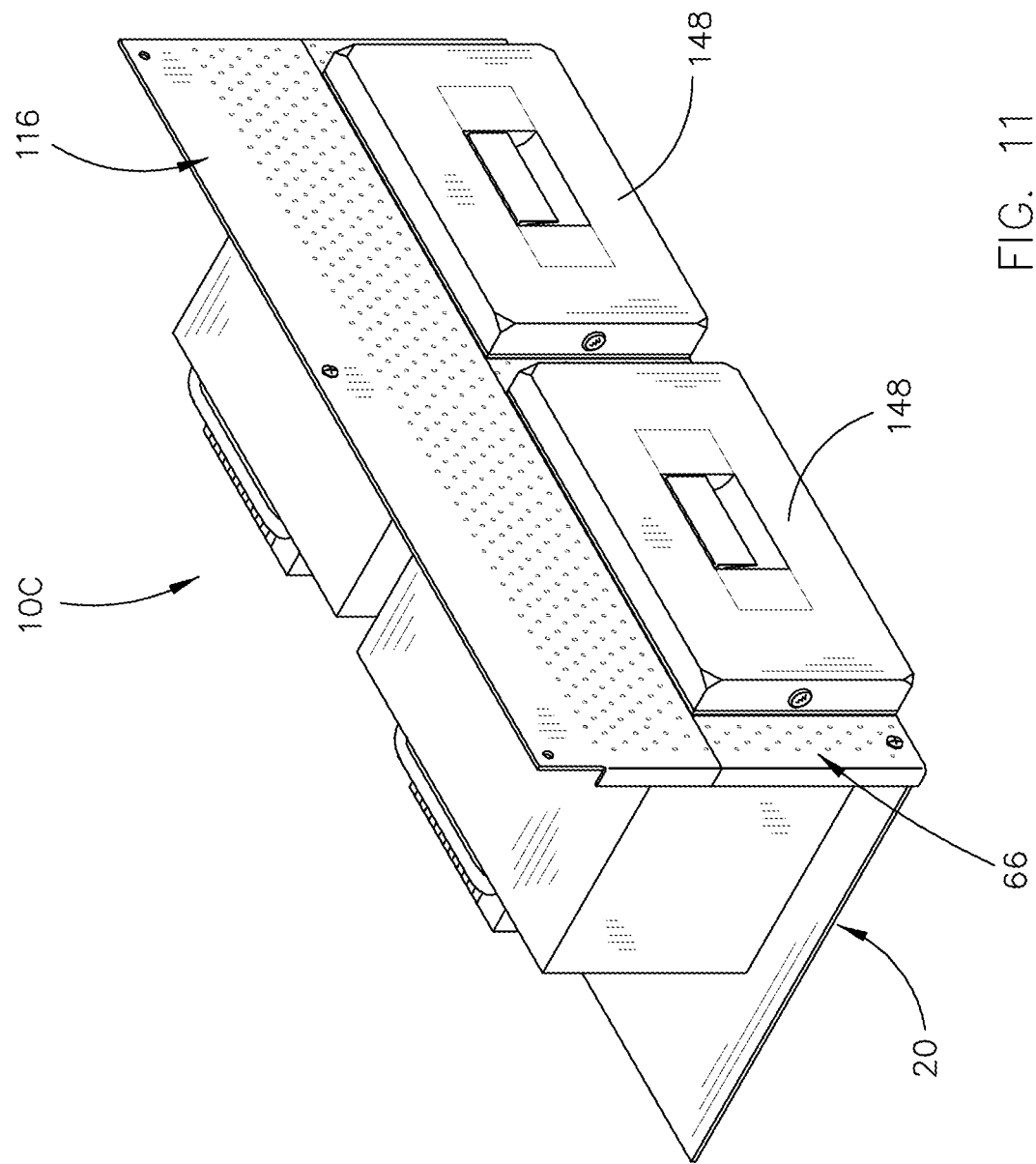
FIG. 11 is a perspective view of a fourth embodiment of the invention.

The fourth embodiment of the invention is shown in FIG. 11 and is referred to by the reference numeral 10C. Embodiment 10C is substantially identical to embodiment 10 except that the refrigerator, freezer or microwave oven 148 are utilized with the trim members thereof being differently configured.

Figure 12:
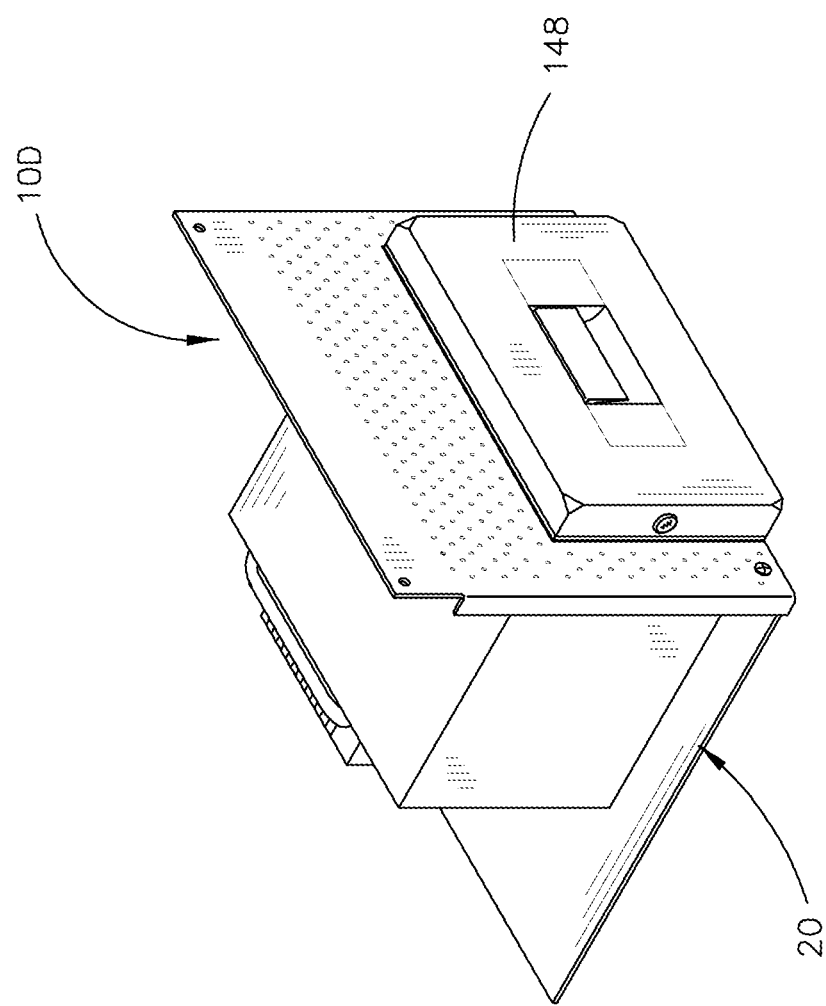
FIG. 12 is a perspective view of a fifth embodiment of the invention.

The fifth embodiment of this invention of FIG. 12 is generally identical to embodiment 10C and is referred to by the reference numeral 10D. The only difference between embodiment 10C and 10D is that only a single refrigerator, freezer or microwave oven 148 is provided with the trim members thereof being modified to compensate for that feature.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. In combination:
   a truck sleeper cab having a floor, a bunk positioned above said floor thereby creating a space therebetween;
   a kit for assembling a horizontally disposed cabinet on said floor of said sleeper cab for placement in said space, comprising:
   (a) a flat and horizontally disposed one-piece mounting plate having a forward end, a rearward end, a first side, a second side, an upper side and a lower side;
   (b) said mounting plate having a plurality of threaded mounting studs extending upwardly therefrom;
   (c) said mounting plate having a plurality of horizontally spaced-apart mounting brackets secured thereto at said forward end thereto;
   (d) a first drawer assembly including a drawer frame having an open forward end, a rearward end, a lower end, an upper end, a first side and a second side;
   (e) said first drawer assembly being configured to be positioned on said mounting plate whereby said first side of said drawer frame is positioned at said first side of said mounting plate and whereby said forward end of said drawer frame is positioned at said forward end of said mounting plate;
   (f) said lower end of said drawer frame being configured to being secured to said mounting plate by said threaded mounting studs;
   a trim assembly:
   said trim assembly being configured to be secured to said mounting brackets so as to be partially positioned around said forward end of said first drawer assembly;
   at least one drawer; and
   said at least one drawer being configured to be movably mounted in said drawer frame.

2. The combination of claim 1 further including a refrigerator which is configured to be mounted on said mounting plate.

3. The combination of claim 1 further including a second drawer assembly which is configured to be mounted on said mounting plate.

4. The combination of claim 1 wherein said bunk includes a frame and wherein a portion of said trim assembly is configured to be secured to said frame of said bunk.

5. The combination of claim 1 wherein said trim assembly has ventilating openings formed therein.

6. The combination of claim 1 further including a freezer which is configured to be mounted on said mounting plate.

7. The combination of claim 1 further including a microwave oven which is configured to be mounted on said mounting plate.

* * * * *